United States Patent [19]
Padget et al.

[11] Patent Number: 4,783,499
[45] Date of Patent: Nov. 8, 1988

[54] VINYLIDENE CHLORIDE POLYMER AQUEOUS LATEX COMPOSITIONS

[75] Inventors: John C. Padget, Frodsham; Donald H. McIlrath, Liverpool, both of England

[73] Assignee: Imperial Chemical Industries PLC, London, England

[21] Appl. No.: 800,212

[22] Filed: Nov. 21, 1985

[30] Foreign Application Priority Data

Dec. 6, 1984 [GB] United Kingdom ............... 8430858
Feb. 21, 1985 [GB] United Kingdom ............... 8504456
Apr. 15, 1985 [GB] United Kingdom ............... 8509560
Jul. 31, 1985 [GB] United Kingdom ............... 8519224

[51] Int. Cl.$^4$ ........................................... C08L 27/00
[52] U.S. Cl. .................... 524/519; 524/522; 524/523; 524/527; 524/560
[58] Field of Search ............... 524/522, 519, 523, 560, 524/527

[56] References Cited

U.S. PATENT DOCUMENTS

| 2,976,203 | 3/1961 | Young et al. | 524/425 |
| 4,057,527 | 11/1977 | Columbus | 524/501 |
| 4,130,528 | 12/1978 | Chen | 524/519 |
| 4,280,942 | 7/1981 | Green | 524/503 |
| 4,341,679 | 7/1982 | Burgess et al. | 524/833 |
| 4,477,622 | 10/1984 | Sanderson et al. | 524/523 |
| 4,543,386 | 9/1985 | Padget et al. | 524/522 |
| 4,543,387 | 9/1985 | Padget et al. | 524/522 |

FOREIGN PATENT DOCUMENTS

| 119698 | 9/1985 | European Pat. Off. | 524/522 |
| 119699 | 9/1985 | European Pat. Off. | 524/522 |
| 1459843 | 12/1976 | United Kingdom . | |

OTHER PUBLICATIONS

"Structure and Properties of Polymers", Boenig, 1973, pp. 256–260.

Primary Examiner—Joseph L. Schofer
Assistant Examiner—N. Sarofim
Attorney, Agent, or Firm—Cushman, Darby & Cushman

[57] ABSTRACT

Aqueous latex contact-adhesive compositions comprising at least one vinylidene chloride copolymer comprising polymerized units of vinylidene chloride and at least one internally plasticizing comonomer which may be provided at least in part by at least one alkyl (meth)acrylate having 1 to 12 carbon atoms in the alkyl group (preferably n-butyl acrylate), said copolymer having a modal molecular weight Mp within the range 100,000 to 700,000 and Tg within the range −50° to 10° C., said composition providing contactable layers after drying. The composition preferably includes a tackifying resin.

22 Claims, No Drawings

VINYLIDENE CHLORIDE POLYMER AQUEOUS LATEX COMPOSITIONS

The present invention relates to aqueous latex compositions comprising at least one vinylidene chloride polymer which compositions are particularly suitable for use in the provision of contact adhesives.

A contact adhesive is a substance which when coated on two substrates to be bonded enables a strong bond to be formed between the substrates on and after initial contact at ambient temperature without the requirement of any sustained pressure or setting time. The contact adhesive is applied to each substrate dissolved or dispersed in a liquid medium, the solutions or dispersions allowed to dry on each substrate, and the dried adhesive layers undergo rapid interfilm coalescence on contact to form almost instantaneously a strong bond; this property is known as contactability.

In the past, contact adhesives have usually been applied as solvent-based compositions, i.e. in compositions wherein the adhesive substance has been dissolved in an organic liquid solvent. However, in recent years attention has been focussed on the toxicity, flammability and pollution problems associated with such systems. This has stimulated a desire to employ systems where the contact adhesive is less hazardously applied as an aqueous-based composition, i.e. in a composition wherein the adhesive substance is dispersed in water.

Currently, aqueous-based contact adhesive compositions appear to be mainly of two types: Neoprene or modified Neoprene-type compositions and acrylate-type compositions. Examples of the former type are described in U.S. Pat. No. 4,130,528 while examples of the latter type are described in U.S. Pat. Nos. 2,976,203, 2,976,204, 4,057,527, 4,280,942, and British Pat. No. 1459843. The search for new aqueous-based contact adhesive compositions nevertheless continues with the objective of obtaining an improved balance of properties such as contactability, mature bond strength and high temperature creep performance.

In an initial approach to this problem we discovered that certain aqueous latex compositions comprising mixtures of two different types of copolymers were possessed of excellent utility as contact adhesive compositions. One such aqueous latex composition comprises a mixture of an amorphous copolymer (type A) comprising polymerised units of vinylidene chloride, an internally plasticising comonomer like 2-ethylhexyl acrylate or n-butyl acrylate, optionally vinyl chloride and optionally a copolymerisable acid, and having Tg in the range $-50°$ to $<0°$ C., and another amorphous copolymer (type B) comprising polymerised units cf vinylidene chloride, an alkyl acrylate and/or methacrylate or certain other comonomers, optionally vinyl chloride, and optionally a copolymerisable acid, and having Tg in the range $0°$ to $30°$ C. This type of composition is described in our European Patent Publication No. 0119698. Another such aqueous latex composition comprises a mixture of an amorphous copolymer (type A) comprising polymerised units of certain selected monomers preferably including vinylidene chloride, an internally plasticising comonomer like 2-ethylhexyl acrylate, optionally vinyl chloride, and optionally a copolymerisable acid, and having Tg in the range $-50°$ to $<0°$ C., and a crystalline copolymer (type B) comprising polymerised units of vinylidene chloride, and having a Tg which is not more than $30°$ C. This type of composition is described in our European Patent Publication No. 0119699. As an optional feature in these aqueous latex compositions, both types of copolymer in each composition can include polymerised units of a comonomer which provides a cross-linking functionality, such a comonomer causing cross-linking during the polymerisation to form the copolymer and/or providing a latent cross-linking functionality whereby cross-linking occurs after the copolymer has been formed (eg. on or after bond formation) either under the influence of an added cross-linking agent or without the requirement for such an agent.

In both of the above-described aqueous latex compositions, the presence of both types of copolymer is said to be an essential feature of the claimed composition.

In recently published U.S. Pat. No. 4,477,622, improved contact adhesives are said to be provided by an aqueous latex composition of an addition polymer or polymer mixture, preferably acrylic in nature, having an extremely wide molecular weight range, this being expressed in terms of a heterogeneity index (defined as the ratio of the weight average molecular weight $M_w$ to the number average molecular weigtt $M_n$) of between 15 and 150. Such a composition is said to be achievable either by blending polymers having extremely low and high molecular weights or, more preferably, by preparing a polymer using a graduated addition of a chain-length regulator to provide a product with species having a uniform progression of from very low molecular weight to very high molecular weight.

We have now discovered that by careful selection of the compositional constituents and modal molecular weight of a vinylidene chloride copolymer it is possible to provide an aqueous latex composition useful for the formation of a contact adhesive yielding bonds having good contactability, good mature bond strength, and good high temperature creep performance, which composition need only contain one such copolymer (i.e. need not contain a mixture of two different types of copolymers as required in the above-described aqueous latex compositions of European Patent Publication Nos. 0 119 698 and 0 119 699) and also need not have a very broad range of molecular weight as required for the acrylic compositions of U.S. Pat. No. 4,477,622, in order to achieve the required properties for the contact adhesive.

According to the present invention there is provided in aqueous latex composition comprising at least one vinylidene chloride copolymer characterised in that said copoymer comprises polymerised units of vinylidene chloride and at least one internally plasticising comonomer, and in that said copolymer has a modal molecular weight Mp (as herein defined) within the range 100,000 to 700,000 and a Tg within the range $-50°$ to $10°$ C., and wherein said composition provides contactable layers after drying.

There is also provided according to the present invention a vinylidene chloride copolymer formed by polymerisation in aqueous emulsion characterised in that said copolymer comprises polymerised units of vinylidene chloride and at least one internally plasticising comonomer and in that said copolymer has a modal molecular weight Mp (as herein defined) within the range 100,000 to 700,000 and a Tg within the range $-50°$ to $10°$ C., and wherein an aqueous latex composition comprising said copolymer provides contactable layers after drying.

In this specification, modal molecular weight Mp is defined as the molecular weight at the peak maximum of the molecular weight distribution curve obtained using a gel permeation chromatograph packed with beads of divinyl benzene gel and calibrated with polystyrene samples of known molecular weight and narrow molecular weight distribution (Weight Average Molecular Weight $M_w$/Number Average Molecular Weight $M_n = 1.05$ to 1.07) to give a linear calibration between polystyrene molecular weights of 1000 and $3.6 \times 10^6$. The weight average and number average molecular weights $M_n$ and $M_w$ and hence the heterogeneity index may also be determined from this distribution curve. The vinylidene chloride copolymer and polystyrene samples for gel permeation chromatography are used as solutions of 0.02 g polymer in 10 ml of H.P.L.C. grade tetrahydrofuran.

It is to be understood that the value of Mp used herein is the measurement obtained using only substantially gel-free copolymer. A copolymer according to the invention may, if desired (although usually it is not preferred), have a degree of cross-linking that has been produced during the polymerisation; this may result in a proportion of gel which, in a sample to be used for the estimation of Mp, is removed by filtration of the tetrahydrofuran solution to be injected into the gel permeation chromatograph before the measurement of Mp.

The vinylidene chloride copolymer of the invention should hae Mp within the range 100,000 to 700,000; if its Mp is below 100,000, an aqueous composition having only said at least one copolymer as the bond-promoting free-radical addition polymeric material cannot be used to provide a contact adhesive with an acceptable balance of adhesive properties. A modal molecular weight Mp of above 700,000 is in our experience unattainable for the copolymers of this invention due to competing chain transfer reactions during polymerisation. The vinylidene chloride copolymer of the invention usually has Mp within the range 100,000 to 500,000, and more usually within the range 100,000 to 400,000; nevertheless vinylidene chloride polymers of the invention with Mp within the range 500,000 to 700,000 are not excluded from the present invention.

By Tg is meant the glass ransition temperature.

The aqueous latex composition of the invention may contain therein more than one vinylidene chloride copolymer according to the invention as defined above, but preferably only contains one such copolymer. The composition may also contain one or more other types of free-radical addition polymers (e.g. produced by the free-radical addition polymerisation or copolymerisation in aqueous emulsion of one or more monomers such as vinylidene chloride, alkyl acrylates and methacrylates having 1 to 12 carbon atoms in the alkyl group, alkoxyalkyl acrylates and methacrylates having 1 to 12 carbon atoms in the alkyl group, styrene, acrylonitrile, vinyl acetate, vinyl ethyl ether, vinyl chloride, ethylene, cis and trans 1,3-butadiene, cis and trans isoprene, cis and trans chloroprene, 1-decene, 1-pentene and 1-octene); (however, the present invention specifically excludes any claim to an aqueous latex composition according to the invention which includes a copolymer of the type B used in the blends of European Patent Publication No. 0119698 or of the type B used in the blends of European Patent Publication No. 0119699 (discussed above) or of the similar type B used in the blends of later-filed GB application No. 85 12685 or of the similar type B used in the blends of the later-filed GB application No. 85 12687;) nevertheless the aqueous latex composition of the invention does not have to (and usually does not) include any such other types of free-radical addition polymers.

The at least one vinylidene chloride copolymer of the preset invention need not have a very wide molecular weight distribution corresponding to a heterogeneity index of 15 or above, although such a distribution is not excluded.

The aqueous latex composition of the invention preferably contains at least one tackifying resin in order to maximise the adhesive performance of the composition; this is particularly the case, in our experience, when the composition contains as substantially the only bond-promoting free-radical polymeric material therein one or more of the vinylidene chloride copolymers as defined. A tackifying resin is a polymeric substance, usually a particular type of condensation polymer, known to the art for further improving the adhesive performance of adhesion-promoting polymers.

Therefore according to a further aspect of the invention there is provided an aqueous latex composition comprising at least one vinylidene chloride copolymer characterised in that said copolymer comprises polymerised units of vinylidene chloride and at least one internally plasticising comonomer, and in that said copolymer has a modal molecular weight Mp (as herein defined) within the range 100,000 to 700,000 and a Tg within the range $-50°$ to $10°$ C., and wherein said aqueous latex composition provides contactable layers after drying, and wherein said composition preferably includes at least one tackifying resin.

The at least one tackifying resin if employed is normally present in an amount of 5 to 100%, more usually 10 to 60% by weight, based on the dry weight of the at least one vinylidene chloride copolymer. Suitable tackifying resins include phenolic resins such as heat reactive alkylphenol/formaldehyde resins, hydroxyalkylated alkylphenol/formaldehyde resins, polyhydric phenol/formaldehyde resins, polyhydric, polynuclear phenol/formaldehyde resins, phenol/formaldehyde resins, and thermoplastic terpene/phenolic resins. The tackifying resin is Preferably incorporated by simply mixing into the composition (with appropriate agitation, e.g. stirring) an aqueous dispersion of the tackifying resin, although the resin can be emulsified in-situ.

There is also provided according to the invention the use of an aqueous latex composition preferably incorporating at least one tackifying resin as defined above as a contact adhesive-forming composition. In accordance with the conventional method of contact bonding, such use is generally effected by coating two substrates to be bonded with the said aqueous latex composition, allowing the aqueous coating on each substrate to dry, and bringing the dry coated substrates into contact usually at ambient temperature and usually without any sustained pressure to effect contact bonding.

A modal molecular weight Mp within the range 100,000 to 700,000 for the vinylidene chloride copolymer of the invention may be achieved by appropriate adjustment of the polymerisation process to produce polymer of higher than usual molecular weight. For example, molecular weight can be increased by decreasing the polymerisation temperature; however a decrease in temperature below about 40° C. may not be commercially attractive because heat transfer becomes difficult, with the result that long polymerisation reaction times and/or very low cooling water temperatures are required.

One effective method of increasing molecular weight to enable a modal molecular weight Mp within the defined range to be attained at the usual commercially attractive polymerisation temperatures (e.g. 40° to 70° C.) entails performing the polymerisation in such a way that the polymerisation is 'monomer-flooded' for at least a substantial part, say at least 20%, of the polymerisation. By the term 'monomer-flooded' is meant that at any given instant during which the polymerisation is in this state then there is a significant proportion of free, unpolymerised monomeric material present in the reaction medium (say more than 5% by weight based on the weight of polymer plus monomer in the reaction medium at that instant). Preferably the polymerisation is monomer-flooded for, say, at least 40% of the polymerisation.

By contrast, vinylidene chloride-based copolymerisations are often performed under monomer-starved conditions for most of the polymerisation (i.e. the polymerisation is not monomer-flooded for most (say more than 80%) of the polymerisation) in order to obtain a homogeneous copolymer or in order to minimise reaction pressure. A typical procedure would be to add 5 to 20% by weight, based on total monomeric material to be polymerised, of an initial monomer mixture to the reaction vessel and to react these monomers to a high degree of conversion (say to at least 95% conversion), and to then feed the remaining monomers at a rate such that the free monomer concentration in the reaction medium does not rise during this stage of the polymerisation. Often, the initially introduced monomers are reacted to a very high conversion to form what is referred to as a seed latex. Such monomer-starved vinylidene chloride-based copolymerisations when used in an attempt to produce copolymers according to the invention do not generally yield molecular weights of 100,000 or above at reaction temperatures of 40° C. or above.

The proportion of free monomer present at any moment of time during polymerisation can be determined by sampling the polymerisation vessel, e.g. by using a pressure-tight sample bomb, and analysing for free unpolymerised monomer by gas-liquid chromatography. In practice a far simpler method to determine whether a polymerisation is monomer-flooded or monomer-starved at any stage of the polymerisation is to allow the polymerisation to proceed as before but to introduce no additional monomer. If the polymerisation is monomer-starved the polymerisation reaction will die away quite quickly (e.g. within 2–10 minutes). On the other hand, if the polymerisation is monomer-flooded the reaction will continue unaffected over this time scale.

There are various ways of ensuring that the polymerisation is monomer-flooded for a substantial proportion of the polymerisation, e.g:

(A) Addition of more than, say, 20% (by weight) of the monomers to be polymerised, but less than the total amount to be polymerised, to the reaction vessel before the start of polymerisation and commencement of monomer feeding before the initial monomer mixture has reacted to a high degree of conversion. It is desirable in this variant to feed the remainder of the monomeric material at such a rate that the polymerisation remains monomer-flooded as defined above. In practice this monomer-flooded condition is maintained by controlling the rate of monomer addition relative to the rate of initiation. If however a large proportion of the monomer mixture (say more than 40% by weight of the total monomers to be polymerised) is added to the reaction vessel before the start of polymerisation, then it will be appreciated that it is less important, though nevertheless desirable, that the subsequent monomer-feeding stage of the polymerisation is maintained in a monomer-flooded state because high molecular weight polymer will be produced during the initial stage of the polymerisation.

(B) In an especially preferred method, monomer-flooding is ensured for a substantial proportion of the polymerisation by performing a series of separate monomer introductions often of equal weight and composition (discontinuous monomer feeding). Thus, for example, the monomer mixture to be polymerised is divdded into a number of equal portions (e.g. 5 to 10), one portion is added to the reaction vessel and polymerisation is commenced. This portion is then reacted to, say, greater than 90% conversion and a second portion of the monomer mixture is then added. This procedure is repeated until all the monomers have been introduced and polymerisation completed. This variant has the advantage of giving both high molecular weight and good colloid stability (i.e. low coagulum formation) and can be employed to give the desired modal molecular weight Mp within the defined range at the usual commercially attractive polymerisation temperatures (e.g. 40° to 70° C.).

It will be appreciated that the above two described techniques are only examples of how the polymerisation might be operated in a monomer-flooded condition, and that there are other possible detailed modifications of the procedure that could be employed to achieve the same objective.

Accordingly in a further aspect of the invention, a modal molecular weight Mp (as defined herein) within the range 100,000 to 700,000 for the vinylidene chloride copolymer of the invention is achieved by employing a monomer-flooded polymerisation process (as defined herein) to prepare the copolymer.

The amount of polymerised vinylidene chloride units in the vinylidene chloride copolymer used in the invention is usually 10 to 90 weight %, more usually 10 to 80 weight %, and very often 10 to 70 weight %. A common range is 20 to 60 weight %.

Preferred vinylidene chloride copolymers used in the invention are copolymers comprising 10 to 70 weight % of polymerised units of vinylidene chloride and 30 to 90 weight % of polymerised units of at least one internally plasticising comonomer.

By an internally plasticising comonomer is meant a comonomer which gives a homopolymer (when polymerised along) of very low Tg, preferably $\leq -40°$ C., more preferably $\leq -50°$ C., and so provides copolymerised units in a copolymer which (if present in sufficient proportion) tend to cause the copolymer to be intrinsically plasticised and thereby have considerably lowered Tg in comparison to a polymer not having such units. Thus the use of such comonomers allows various desired values of Tg to be readily achieved. Suitable plasticising comonomers include certain kinds of alkyl and alkoxyalkyl acrylates and methacrylates such as n-butyl acrylate, 2-ethylhexyl acrylate, n-decyl methacrylate, n-octyl acrylate, 2-ethylbutyl acrylate, n-heptyl acrylate, 2-heptyl acrylate, n-hexyl acrylate, 3-methylbutyl acrylate, n-nonyl acrylate, 2-octyl acrylate, n-propyl acrylate, 1-ethoxyethyl acrylate, 1-ethoxypropyl acrylate, 2-methoxyethyl acrylate, 3-methoxypropyl acrylate and propoxylated acrylates and methacrylates, and other monomers such as ethylene, 1,3- butadiene, isoprene, chloroprene, 1-decene, 1-pentene, and 1-octene. Of these, n-butyl acrylate and 2-ethylhexyl acrylate are usually preferred with n-butyl acrylate being particularly preferred. The proportion of polymerised units of the internally plasticising comonomer in the above-mentioned preferred vinylidene chloride copolymers is more preferably 40 to 80 weight %.

Particularly preferred vinylidene chloride copolymers for use in the invention are those which comprise units of at least one alkyl acrylate or methacrylate having 1 to 12 (preferably 2 to 10 and more preferably 2 to 8) carbon atoms in the alkyl group. As can be surmized from the examples of plasticising comonomers listed above, the said at least one alkyl acrylate or methacrylate of 1 to 12 carbon atoms in the alkyl group can optionally provide at least part of the units of internally plasticising comonomer(s) in the copolymer. One particularly preferred alkyl acrylate is n-butyl acrylate (an internally plasticising comonomer), and the vinylidene chloride copolymer used in the invention may comprise this comonomer as the sole (meth)acrylate and plasticising comonomer therein, because an aqueous latex composition of such a copolymer gives contactable layers after drying (although, of course, the n-butyl acrylate can be used in combination with one or more other alkyl (meth)acrylates as defined above). Examples of other alkyl (meth)acrylates which may be used are ethyl acrylate (not internally plasticising) and 2-ethylhexyl acrylate (internally plasticising), although it should be noted that ethyl acrylate must generally be used in combination with a higher internally plasticising acrylate comonomer such as 2-ethyl- hexyl acrylate if a composition comprising a copolymer made therefrom is to provide contactable layers after drying.

The amount of such polymerised (meth)acrylate units in the vinylidene chloride copolymer of the invention (if used) is usually within the range 10 to 90 weight %, and is preferably 30 to 90 weight %, more preferably 40 to 80 weight %.

Accordingly further preferred vinylidene chloride copolymers for use in the invention comprise 10 to 70 weight % of polymeised units of vinylidene chloride, 30 to 90 weight % of polymerised units of at least one internally plasticising comonomer, and 30 to 90 weight % of polymerised units of at least one alkyl acrylate or methacrylate having 1 to 12 carbon atoms in the alkyl group and optionally providing at least part of the units of said internally plasticising comonomer.

The vinylidene chloride copolymer of the invention may optionally comprise polymerised units (usually in an amount of up to 20% by weight, i.e. the copolymer may comprise 0 to 20% by weight thereof) of other copolymerisable comonomers, such as vinyl chloride, alkyl acrylates and methacrylates having 13 to 18 carbon atoms in the alkyl group, alkoxyalkyl acrylates and methacrylates having 1 to 18 carbon atoms in the alkyl groups, styrene, acrylonitrile, vinyl acetate, vinyl ethyl ether, ethylene, cis and trans 1,3-butadiene, cis and trans isoprene, cis and trans chloroprene, 1-decene, 1-pentene and 1-octene; in particular it may optionally comprise polymerised units of at least one copolymerisable ethylenically unsaturated acid (usually in an amount of up to 10% by weight, i.e. the copolymer may comprise 0 to 10% by weight of such units and more usually 0.1 to 8% by weight if present).

The vinylidene chloride polymer of the invention may be amorphous or partially crystalline although it is more usually amorphous (with less than 5% and more usually substantially zero crystallinity), being non-crystalline in the latex and not crystallising on or after bond formation.

The vinylidene chloride copolymer of the invention preferably has a Tg in the range from −40° to 10° C., and more preferably from −20° to 0° C., and particularly preferably from −20° to −2° C. A range of −20° to 10° C. may also be very useful.

As mentioned above, the vinylidene chloride copolymer of the present invention may optionally contain polymerised units of at least one multi-functional comonomer that has effected, when present, a partial (in the sense of a degree of) cross-linking during the polymerisation (resulting in the formation of some insoluble gel), as this can sometimes improve the creep performance properties of the copolymer. Multi-functional comonomers providing this type of crosslinking are polyunsaturated monomers examples of which include allyl methacrylate, diallyl maleate, diallyl phthalate and divinyl benzene.

Thus units of such multi-functional comonomers can be present in an amount usually in the range of up to 10 weight %, i.e. the copolymer may comprise 0 to 10 weight % of such units (or more usually if present 0.01 to 10 weight %, preferably 0.01 to 5 weight %). Nevertheless, as mentioned before, even though such cross-linking also increases molecular weight, it is not usually preferred that a copolymer according to the invention contains such polymerised units; this is because the partial cross-linking effected during polymerisation often adversly effects the contactability properties of the copolymer, and, although a small degree of cross-linking can be tolerated, it is not recommended as a general rule.

Besides optionally including polymerised units of at least one multi-functional comonomer which causes cross-linking during polymerisation, the vinylidene chloride copolymer of the invention may also optionally possess polymerised units of at least one comonomer which provides a latent cross-linking functionality; a latent cross-linking functionality is one where the functional group or groups of the comonomer cause cross-linking not during polymerisation but subsequent to polymerisation (e.g. on or after bond formation), and this can also sometimes enhance the creep properties of the copolymer. The latent cross-linking functionality can be one which is activated by the presence in the composition of a cross-linking agent (e.g. a divalent metal ion such as zinc) or can be one which is activated without the requirement for a cross-linking agent e.g. spontaneously at ambient temperature on ageing or more usually under the influence of heat. Examples of comonomers having a latent type of cross-linking functionality where latent cross-linking is possible either at ambient temperature on ageing, or by heating, or by virtue of an externally added cross-linking agent or by more than one of these possibilities, have functional groups capable of crosslinking by various mechanisms including self crosslinking or mutual cross-linking by different functional groups, both in the polymer chain; examples of comonomers providing this type of cross-linking funtionality include comonomers having reactive polar groups such as hydroxyl, thiol, amino, amide, isocyanate, nitrile, carboxy, and epoxide groups. Examples of such comonomers include glycidyl methacrylate and acrylate, methylaminoethyl methacrylate and acrylate, t-butylaminoethyl methacrylate and acrylate, methacrylamide, 4-pentanoguanamine, hydroxylalkyl esters such as hydroxypropyl methacrylate, hydroxyethyl methacrylate and hydroxyethyl acrylate, methacrylonitrile, N-alkoxyalkyl amides such as methoxymethyl methacrylamide and butoxy-methyl acrylamide, and hydroxyalkyl amides such as N-methylol methacrylamide and N-methylol acrylamide, and dicarboxylic acids such as maleic acid. The at least one monomer to provide a latent cross-linking functionality is usually used in an amount to provide 0 to 10 weight % and, if present, usually 0.01 to 10 weight % of polymerised units in the vinylidene chloride copolymer.

In the vinylidene chloride copolymer of the invention the at least one ethylenically unsaturated copolymerisable acid, if used, which primarily provides an adhesion-promoting functionality, is preferably an ethylenically unsaturated carboxylic acid or a sulphonic acid, such as 2-acrylamide-2-methylpropane sulphonic acid. Particularly preferred acids are aliphatic alpha, beta-unsaturated carboxylic acids and especially acrylic acid; other carboxylic acids of this type which may be used include methacrylic acid, itaconic acid and citraconic acid. Other monomers which provide an adhesion-promoting functionality may be used in conjunction with or in place of the ethylenically unsaturated acid (e.g. in an amount of 0 to 10 weight %). It may be mentioned that the at least one ethylenically unsaturated carboxylic acid can also provide units which impart a latent cross-linking functionality as discussed above if the composition includes a cross-linking agent.

The polymerisation to form the vinylidene chloride copolymer may be carried out by known emulsion polymerisation techniques; for example, copolymerisation in an aqueous medium with the aid of a free-radical-yielding initiator and usually in the presence of a surface active agent and preferably (as discussed above) using a 'monomer-flooding' polymerisation technique, or alternatively (but less preferably) a low polymerisation temperature, or a combination of the two methods, to achieve increased molecular weight.

The aqueous latex composition of the invention may also include substances such as thickeners, stabilizers, humectats, fillers, surfactants, pigments, dyes, fungicides, coalescing agents, cross-linking agents, and/or other material required for any particular application. Such substances (if used) may be incorporated or formulated into the latex compositions of the present invention by any suitable technique, e.g. by simple mixing and stirring.

The composition of the present invention may be used to provide contact adhesion for a variety of substrates, the materials joined either being the same or (more usually) different. Such substrates include wood, paper, natural or artificial textiles, various forms of panelling such as plyboard, particleboard, plasterboard, various plastics materials, various minerals such as glass, asbestos, carbon fibre, concrete, plaster and ceramics, and metals such as iron, steel and aluminium.

The present invention is illustrated by the following examples; the prefix C in an example denotes a comparative example; unless otherwise specified all parts, percentages, and ratios are on a weight basis.

Contactability in the examples is assessed by applying two brush coats of the aqueous latex composition (intended to provide the contact adhesive) to unproofed cotton duck (i.e. unproofed canvas), allowing the first brush coat to dry as indicated by a clearness of the adhesive film before applying the second coat. When the second adhesive coat is dry the coated surfaces are brought together under light hand roller pressure to form the adhesive bond the strength of which is then tested immediately as a 25 mm wide strip on an Instron tensile testing machine set at a crosshead speed of 10 cm/minute. By considering the initial bond strength it is possible to determine whether interfilm coalescence has occurred and hence whether or not the adhesive is contactable.

Creep at elevated temperatures or creep resistance unless otherwise specified is determined by preparing a test specimen as for contactability but ageing for 7 days prior to testing. Creep resistance is assessed by equilibrating the sample at 60° C. and recording the distance peeled or crept in mm/minute under a static load of 1 kg or 2 kg (as indicated). 7-Day Bond Strength is determined by preparing a test specimen as for contactability but leaving to age for 7 days prior to testing for bond strength.

Wood/Wood Shear Strength is determined by preparing a 25 mm square lap joint from 4.5 inch×1 inch×0.25 inch Beechwood test strips conforming to Appendix A of BS 1204, 1956. 0.15 ml of adhesive composition is applied to each surface to be contacted and allowed to dry before contacting. The bond is aged for 7 days prior to testing on an Instron tensile testing machine at a withdrawal rate of 5 mm/minute.

The key to the monomer notation used in the examples is as follows:
VDC Vinylidene chloride
BA n-butyl acrylate
AA acrylic acid
EA ethyl acrylate
EHA 2-ethylhexyl acrylate
MMA methyl methacrylate Tg's for the copolymers were determined by differential scanning calorimetry.

The procedure for measurement of modal molecular weights Mp of the copolymers exemplified (as defined hereinbefore) involved dissolving 0.02 g of polymer in 10 ml of H.P.L.C. grade tetrahydrofuran and after filtration through a 0.2 micron membrane injecting on to the gel permeation chromatograph at a solvent flow rate of 1 ml/minute and a temperature of 40° C. The weight of polymer eluted from the chromatograph was measured using an Applied Chromatograph Services mass detector, and was plotted as a function of elution time. The molecular weight distribution curves also allowed the determination of $M_w$ and $M_n$ and hence heterogeniety indices (where required).

EXAMPLES C1 to C8, 9 to 15

Aqueous vinylidene chloride copolymer latices were prepared (Examples C1 to C8, 9 to 15) by emulsion polymerisation; those of Examples C1 to C8 were made using monomer-starved conditions to obtain modal molecular weights (Mp) below 100,000, while those of Examples 9 to 15 were made using monomer-flooded conditions to obtain Mp's above 100,000. The compositions of the copolymers, their Tg's and Mp's are shown in Table 1. The copolymer latices were formulated with the tackifying resin Ucar Phenolic Resin dispersion BKUA 2370 (manufactured by Union Carbide) by mixing and stirring to give a polymer/resin ratio of 3/1 w/w solids. The resulting compositions were tested for adhesive performance as indicated in the table.

It is seen that the copolymer latices of Examples C1 to C8 gave compositions with worse creep resistance in comparison to the compositions made from Examples 9 to 15 (according to the invention) which had an excellent balance of adhesive properties.

It may be of interest to note that the vinylidene chloride copolymers of Examples 9 to 15 according to the invention had heterogeneity indices of 5.97, 6.09, 12.5, 9.5, 12.9, 11.6 and 3.4 respectively, showing that they did not possess extremely wide molecular weight distributions.

fied in Example 33 of EP Publication No. 0 119 698. Example 19 is a composition corresponding exactly to the copolymer latex of Example 9, i.e. without any phenolic tackifying added thereto (in order to obtain a true comparison with the compositions of Examples C3, C3, and C15 of EP Publication No. 0 119 698 which also did not contain a tackifying resin). The results are shown in Table 2.

It will be noted that the compositions of Examples

TABLE 1

| Ex. No | Polymer Composition | Tg °C. | Mp | Adhesive Properties of Polymer/Resin Composition | | | | |
|---|---|---|---|---|---|---|---|---|
| | | | | Contactability N | -Day Bond Strength. N | Creep mm/min | | Wood/Wood Shear Strength N. |
| | | | | | | 1 Kg | 2 Kg | |
| C1 | VDC/BA/AA 36.0/62.0/2.0 | −4 | 75377 | 11.9 | 52.5 | 5.3 | 32.2 | 1615 |
| C2 | VDC/BA/AA 36.4/61.6/2.0 | −5 | 75318 | 23.9 | 75.8 | 16.0 | ND | 1717 |
| C3* | VDC/BA/AA 35.8/62.2/2.0 | −6 | 69656 | 36.5 | 78.0 | 15.0 | ND | 1155 |
| C4 | VDC/BA/AA 35.9/62.1/2.0 | −6 | 57143 | 17.0 | 44.5 | 8.7 | ND | 1756 |
| C5 | VDC/BA/AA 35.1/62.9/2.0 | −8.5 | 70841 | 29.7 | 62.4 | 12.4 | ND | 1885 |
| C6 | VDC/BA/AA 48.1/49.9/2.0 | 6 | 91013 | 15.6 | 90.4 | 23.0 | ND | 2148 |
| C7 | VDC/EA/EHAA/AA 25.2/31.2/41.6/2.0 | −15 | 89752 | 34.9 | 55.3 | 25.1 | ND | 466 |
| C8 | VDC/EHA/AA 45.0/53.0/2.0 | −19 | 85108 | 35.8 | 47.0 | 56.0 | ND | 1028 |
| 9 | VDC/BA/AA 27.0/71.0/2.0 | −14 | 100755 | 25.8 | 95.3 | 0.4 | 3.7 | 1609 |
| 10 | VDC/BA/AA 29.5/68.5/2.0 | −7 | 121700 | 22.6 | 42.2 | 1.0 | 4.4 | 1569 |
| 11 | VDC/BA/AA 20.1/77.9/2.0 | −20 | 123410 | 12.5 | 52.3 | 0.6 | 5.5 | 2132 |
| 12 | VDC/BA/AA 29.5/68.5/2.0 | −8 | 157710 | 12.6 | 38.5 | 0.6 | 4.8 | 2063 |
| 13 | VDC/BA/AA 35.8/62.2/2.0 | −8 | 174590 | 6.7 | 80.7 | 1.5 | 7.2 | 1757 |
| 14 | VDC/BA/AA 35.2/62.8/2.0 | −8 | 283682 | 15.5 | 97.8 | 0.4 | 1.6 | 1866 |
| 15 | VDC/BA/AA 27.3/70.7/2.0 | −13 | 124803 | 32.6 | 77.0 | 2.2 | 13.6 | 2406 |

ND = not determined
*the polymer C3 corresponds to the experimental ICI grade known as "Haloflex" ECL 220

EXAMPLES C16 to C18 and 19

These examples compare the contactability and creep properties of a composition according to the invention with those of aqueous latex compositions containing vinylidene chloride copolymers exemplified in our EP Publication No. 0 119 698, all the copolymers exemplified therein having been prepared under monomer-starved conditions and consequently having had Mp's well below 100,000. Thus, Examples C16 and C17 correspond respectively to Examples C3 and C15 of EP Publication No. 0 119 698, while Example C18 corresponds to the 2/1 blend of these copolymers as exemplified in Example 33 of EP Publication No. 0 119 698.

C16 and C17, each containing only a single VDC copolymer, had respectively good contactability but poor creep resistance (C16) or zero contactability (C17) (as shown in EP Publication No. 0 119 698). The blend composition C18 had an improved balance of contactability and creep resistance (also as shown and claimed in EP Publication No. 0 119 698).

The composition of Example 19, even though containing only a single VDC copolymer, also possessed a good balance of contactability and creep properties (the latter property actually being superior to that of the blend).

| Ex. No. | Polymer from | Polymer Composition | Tg | Mp | Contactability N | Creep 1 kg mm/min |
|---|---|---|---|---|---|---|
| C16 | EP Pub. 0 119 698 (Ex. C3 thereof) | VDC/BA/AA 28.7/69.3/2.0 | −13 | 65000* | 21.6 | 68 |
| C17 | EP Pub. 0 119 698 (Ex. C15 thereof) | VDC/BA/MMA/AA 57.5/26.9/13.6/2.0 | 22 | 40000* | 0 | — |
| C18 | EP Pub 0 119 698 (Ex 33 thereof) | 2/1 blend of C16 and C17 | — | — | 22.6 | 18 |
| 19 | Ex. 9 | VDC/BA/AA 27.0/71.0/2.0 | −14 | 100755 | 11.2 | 3.3 |

*estimate based on measured value of more recently prepared copolymer of almost identical composition prepared using the same polymerisation process (Mp of original polymer not measured and none now available for such measurement)

We claim:

1. An aqueous latex composition comprising at least one vinylidene chloride copolymer characterised in that said at least one vinylidene chloride copolymer comprises 10 to 70 weight % of polymerised units of vinylidene chloride, 30 to 90 weight % of polymerised units of at least one internally plasticising comonomer, and 30 to 90 weight % of polymerised units of at least one alkyl acrylate or methacrylate having 1 to 12 carbon atoms in the alkyl group, the amount of all polymerised units in said copolymer totalling 100 weight %, said copolymer having a modal molecular weight Mp within the range 100,000 to 700,000 and a Tg within the range −50° to 10° C., and wherein said composition provides contactable layers after drying.

2. A copolymer formed by polymerisation in aqueous emulsion characterised in that said copolymer comprises 10 to 70 weight % of polymerised units of vinylidene chloride, 30 to 90 weight % of polymerised units of at least one internally plasticising comonomer, and 30 to 90 weight % of polymerised units of at least one alkyl acrylate or methacrylate having 1 to 12 carbon atoms in the alkyl group, the amount of all polymerised units in said copolymer totalling 100 weight %, said copolymer having a modal molecular weight Mp within the range 100,000 to 700,000 and a Tg within the range −50° to 10° C., and wherein an aqueous latex composition comprising said copolymer provides contactable layers after drying.

3. An aqueous latex composition according to claim 1 characterised in that said at least one vinylidene chloride copolymer is substantially the only free-radical addition polymer contained in said composition.

4. An aqueous latex composition according to claim 3 characterised in that said composition includes at least one tackifying resin.

5. An aqueous latex compositon according to claim 1 characterised in that said at least one plasticising comonomer is selected from n-butyl acrylate and 2-ethylhexyl acrylate.

6. An aqueous latex composition according to claim 1 characterised in that said at least one alkyl acrylate or methacrylate provides at least part of the polymerised units of internally plasticising comonomer(s) in said copolymer.

7. An aqueous latex commposition according to claim 1 characterised in that said at least vinylidene chloride copolymer contained in the composition comprises polymerised units of at least one ethylenically unsaturated aoid.

8. An aqueous latex composition according to claim 2 characterised in that said acid is an aliphatic alpha, beta-unsaturated carboxylic acid.

9. An aqueous latex composition according to claim 8 characterised in that the proportion of said polymerised acid units in the copolymer is up to 10 weight %.

10. An aqueous latex composition according to claim 1 characterised in that said at least one vinylidene chloride copolymer contained in the composition comprises polymerised units of at least one type of comonomer to provide a cross-linking functionality.

11. An aqueous latex composition according to claim 1 characterised in that said at least vinylidene chloride copolymer contained therein has Mp in the range of from 100,000 to 500,000.

12. An aqueous latex according to claim 1 characterised in that said at least one vinylidene chloride copolymer contained therein has a Tg in the range from −40° to 10° C.

13. A copolymer according to claim 2 characterised in that said at least one plasticising comonomer is selected from n-butyl acrylate and 2-ethylhexyl acrylate.

14. A copolymer according to claim 2 characterised in that said at least one alkyl acrylate or methacrylate provides at least part of the polymerised units of internally plasticising comonomer(s) in said copolymer.

15. A copolymer according to claim 2 characterised in that said copolymer comprises polymerised units of at least one ethylenically unsaturated acid.

16. A copolymer according to claim 15 characterised in that said acid is an aliphatic alpha, beta-unsaturated carboxylic acid.

17. A copolymer according to claim 14 characterised in that the proportion of said polymerised acid units in the copolymer is up to 10 weight %.

18. A copolymer according to claim 2 charactrised in that said copolymer comprises polymerised units of at least one type of comonomer to provide a cross-linking functionality.

19. A copolymer according to claim 2 characterised in that said copolymer has Mp in the range of from 100,000 to 500,000.

20. A copolymer according to claim 2 characterisesd in that said copolymer has a Tg in the range from −40° to 10° C.

21. A copolymer according to claim 2 characterised in that said copolymer has been formed by a monomer-flooded polymerised process.

22. A process of contact bonding which comprises coating two substrates to be bonded with an aqueous lates composition according to claim 1; allowing the aqueous based coating on each substrate to dry; and bringing the dry coated substrates into contact to effect contact bonding.

* * * * *